United States Patent
Hagen et al.

(10) Patent No.: US 8,134,542 B2
(45) Date of Patent: Mar. 13, 2012

(54) UNTETHERED STYLUS EMPLOYING SEPARATE COMMUNICATION AND POWER CHANNELS

(75) Inventors: Kathy L. Hagen, Stillwater, MN (US); Albert H. Libbey, Eliot, ME (US)

(73) Assignee: 3M Innovative Properties Company, Saint Paul, MN (US)

( * ) Notice: Subject to any disclaimer, the term of this patent is extended or adjusted under 35 U.S.C. 154(b) by 1161 days.

(21) Appl. No.: 11/613,614

(22) Filed: Dec. 20, 2006

(65) Prior Publication Data

US 2008/0150918 A1 Jun. 26, 2008

(51) Int. Cl.
*G06F 3/033* (2006.01)
*G06F 3/041* (2006.01)
*G06F 3/046* (2006.01)

(52) U.S. Cl. .................. 345/179; 178/18.01; 178/18.03; 178/18.07; 178/19.01; 178/19.03

(58) Field of Classification Search .................. 345/179; 178/18.01–18.11, 19.01–19.07
See application file for complete search history.

(56) References Cited

U.S. PATENT DOCUMENTS

| | | |
|---|---|---|
| 3,072,849 A | 1/1963 | Firestone |
| 3,617,922 A | 11/1971 | Bernstein |
| 3,983,322 A | 9/1976 | Rodgers |
| 4,029,869 A | 6/1977 | Ingram et al. |
| 4,289,926 A | 9/1981 | Kobayashi |
| 4,289,927 A | 9/1981 | Rodgers |
| 4,353,552 A | 10/1982 | Pepper |
| 4,360,790 A | 11/1982 | Heise |
| 4,455,451 A | 6/1984 | Kriz |
| 4,473,717 A | 9/1984 | Parnell et al. |
| 4,672,154 A | 6/1987 | Rodgers et al. |
| 4,686,332 A | 8/1987 | Greanias et al. |
| 4,786,765 A | 11/1988 | Yamanami et al. |
| 4,848,496 A | 7/1989 | Murakami et al. |
| 4,878,553 A | 11/1989 | Yamanami et al. |
| 4,893,115 A | 1/1990 | Blanchard |

(Continued)

FOREIGN PATENT DOCUMENTS

CN 1512345 7/2004

(Continued)

OTHER PUBLICATIONS

U.S. Appl. No. 11/557,829, entitled "Touch Location Sensing System and Method Employing Sensor Data Fitting to a Predefined Curve," filed Nov. 8, 2006.

(Continued)

*Primary Examiner* — Bipin Shalwala
*Assistant Examiner* — Benyam Ketema
(74) *Attorney, Agent, or Firm* — Steven A. Bern

(57) ABSTRACT

An untethered stylus is configured to cooperate with a location sensor that generates a magnetic field. The stylus include a housing having a tip and a shield. Circuitry, including a power circuit, is provided in the housing. An antenna arrangement provided at the housing includes multiple coil resonant circuits each tuned to a different frequency of the magnetic field. A first coil resonant circuit energizes the power circuit in response to the magnetic field, which provides DC power to the circuitry. One or more other coil resonant circuits are coupled between the tip and shield of the housing to define separate channels for communicatively coupling the stylus tip and the location sensor. An information signal communicated between the stylus tip and the location sensor is substantially unperturbed during provision of DC power by the first coil resonant circuit.

22 Claims, 9 Drawing Sheets

U.S. PATENT DOCUMENTS

| | | | |
|---|---|---|---|
| 4,902,858 A | 2/1990 | Yamanami et al. | |
| 4,948,926 A | 8/1990 | Murakami et al. | |
| 4,956,526 A | 9/1990 | Murakami et al. | |
| 4,988,837 A | 1/1991 | Murakami et al. | |
| 4,999,461 A | 3/1991 | Murakami et al. | |
| 5,028,745 A | 7/1991 | Yamanami et al. | |
| RE33,740 E | 11/1991 | Taguchi et al. | |
| RE33,805 E | 1/1992 | Yamanami et al. | |
| 5,083,118 A | 1/1992 | Kazama | |
| 5,122,623 A * | 6/1992 | Zank et al. | 178/19.04 |
| 5,130,500 A | 7/1992 | Murakami et al. | |
| 5,138,118 A | 8/1992 | Russell | |
| RE34,187 E | 3/1993 | Yamanami et al. | |
| 5,191,175 A | 3/1993 | Protheroe et al. | |
| 5,194,819 A | 3/1993 | Briefer | |
| 5,218,173 A | 6/1993 | Garwin et al. | |
| 5,218,174 A | 6/1993 | Gray et al. | |
| 5,305,017 A | 4/1994 | Gerpheide | |
| 5,337,040 A | 8/1994 | Kind | |
| 5,369,227 A | 11/1994 | Stone | |
| 5,373,118 A | 12/1994 | Watson | |
| 5,374,787 A | 12/1994 | Miller | |
| 5,381,137 A | 1/1995 | Ghaem et al. | |
| 5,402,151 A | 3/1995 | Duwaer | |
| 5,414,227 A | 5/1995 | Schubert et al. | |
| 5,420,379 A | 5/1995 | Zank et al. | |
| 5,420,804 A | 5/1995 | Tanaka et al. | |
| 5,475,401 A * | 12/1995 | Verrier et al. | 345/179 |
| 5,486,847 A | 1/1996 | Ranf et al. | |
| 5,506,375 A | 4/1996 | Kikuchi | |
| 5,528,002 A | 6/1996 | Katabami | |
| 5,530,210 A | 6/1996 | Fukuzaki | |
| 5,557,076 A | 9/1996 | Wieczorek et al. | |
| 5,565,658 A | 10/1996 | Gerpheide et al. | |
| 5,571,997 A | 11/1996 | Gray et al. | |
| 5,594,215 A | 1/1997 | Jeng | |
| 5,608,390 A * | 3/1997 | Gasparik | 340/870.01 |
| 5,619,431 A | 4/1997 | Oda | |
| 5,629,500 A | 5/1997 | Fukuzaki et al. | |
| 5,633,471 A | 5/1997 | Fukushima | |
| 5,644,108 A * | 7/1997 | Katsurahira et al. | 178/18.07 |
| 5,661,269 A | 8/1997 | Fukuzaki et al. | |
| 5,675,130 A | 10/1997 | Sekizawa | |
| 5,682,019 A | 10/1997 | Katsurahira et al. | |
| 5,691,512 A | 11/1997 | Obi | |
| 5,691,513 A | 11/1997 | Yamamoto et al. | |
| 5,693,914 A | 12/1997 | Ogawa | |
| 5,706,000 A | 1/1998 | Fukuzaki et al. | |
| 5,714,984 A | 2/1998 | Fukuzaki et al. | |
| 5,730,165 A | 3/1998 | Philipp | |
| 5,748,110 A | 5/1998 | Sekizawa et al. | |
| 5,751,229 A | 5/1998 | Funahashi | |
| 5,763,839 A | 6/1998 | Funahashi et al. | |
| 5,790,106 A | 8/1998 | Hirano | |
| 5,792,997 A | 8/1998 | Fukuzaki | |
| 5,793,360 A | 8/1998 | Fleck et al. | |
| 5,815,091 A * | 9/1998 | Dames et al. | 340/870.34 |
| 5,861,583 A | 1/1999 | Schediwy et al. | |
| 5,898,136 A | 4/1999 | Katsurahira | |
| 5,914,708 A | 6/1999 | LaGrange et al. | |
| 5,914,710 A | 6/1999 | Chen et al. | |
| 5,945,980 A | 8/1999 | Moissev et al. | |
| 5,973,677 A * | 10/1999 | Gibbons | 345/179 |
| 5,986,646 A | 11/1999 | Chen et al. | |
| 6,002,387 A * | 12/1999 | Ronkka et al. | 345/157 |
| 6,005,555 A | 12/1999 | Katsurahira et al. | |
| 6,020,849 A | 2/2000 | Fukuzaki | |
| 6,064,374 A | 5/2000 | Fukuzaki | |
| 6,075,468 A | 6/2000 | Sugiyama | |
| 6,118,435 A | 9/2000 | Fujita et al. | |
| 6,133,906 A | 10/2000 | Geaghan | |
| 6,137,427 A | 10/2000 | Binstead | |
| 6,178,818 B1 | 1/2001 | Plöchinger | |
| 6,215,476 B1 | 4/2001 | Depew et al. | |
| 6,249,234 B1 | 6/2001 | Ely et al. | |
| 6,307,385 B1 | 10/2001 | Tardif et al. | |
| 6,380,931 B1 | 4/2002 | Gillespie et al. | |
| 6,433,781 B1 | 8/2002 | Oda et al. | |
| 6,466,036 B1 | 10/2002 | Philipp | |
| 6,476,799 B1 | 11/2002 | Lee et al. | |
| 6,546,107 B1 | 4/2003 | Bohnke | |
| 6,549,096 B2 | 4/2003 | Groves et al. | |
| 6,576,850 B2 | 6/2003 | Fukushima et al. | |
| 6,587,098 B2 | 7/2003 | Teterwak | |
| RE38,286 E | 10/2003 | Flowers | |
| 6,667,740 B2 * | 12/2003 | Ely et al. | 345/179 |
| 6,670,561 B2 * | 12/2003 | Aoki | 178/18.01 |
| 6,690,156 B1 | 2/2004 | Weiner et al. | |
| 6,762,752 B2 | 7/2004 | Perski et al. | |
| 6,790,160 B2 | 9/2004 | Kato et al. | |
| 6,927,762 B2 | 8/2005 | Lin | |
| 6,970,160 B2 | 11/2005 | Mulligan et al. | |
| 7,019,672 B2 | 3/2006 | Ely | |
| 7,030,782 B2 | 4/2006 | Ely et al. | |
| 7,079,118 B2 | 7/2006 | Benard et al. | |
| 7,241,954 B2 | 7/2007 | Kanai | |
| 7,265,303 B2 | 9/2007 | Thacker | |
| 7,411,584 B2 | 8/2008 | Hill et al. | |
| 7,436,164 B2 | 10/2008 | Vos | |
| 7,453,444 B2 | 11/2008 | Geaghan | |
| 7,474,300 B2 | 1/2009 | Katsurahira et al. | |
| 7,787,259 B2 | 8/2010 | Free et al. | |
| 7,812,268 B2 * | 10/2010 | Ely | 178/18.03 |
| 7,907,130 B2 | 3/2011 | Ely | |
| 2002/0050983 A1 | 5/2002 | Liu et al. | |
| 2003/0001692 A1 | 1/2003 | Chiu et al. | |
| 2003/0067447 A1 | 4/2003 | Geaghan et al. | |
| 2003/0090347 A1 | 5/2003 | Losehand et al. | |
| 2004/0004488 A1 | 1/2004 | Baxter | |
| 2004/0092229 A1 | 5/2004 | Hessel | |
| 2004/0095333 A1 | 5/2004 | Morag et al. | |
| 2004/0104826 A1 | 6/2004 | Philipp | |
| 2004/0155871 A1 | 8/2004 | Perski et al. | |
| 2004/0233178 A1 | 11/2004 | Silk et al. | |
| 2005/0083307 A1 | 4/2005 | Aufderheide et al. | |
| 2005/0099188 A1 | 5/2005 | Baxter | |
| 2005/0128191 A1 | 6/2005 | Katsurahira et al. | |
| 2005/0146513 A1 | 7/2005 | Hill et al. | |
| 2005/0162411 A1 * | 7/2005 | Berkel van | 345/179 |
| 2005/0171714 A1 | 8/2005 | Ely et al. | |
| 2005/0174259 A1 | 8/2005 | Ely | |
| 2006/0016800 A1 | 1/2006 | Paradiso et al. | |
| 2006/0022959 A1 | 2/2006 | Geaghan | |
| 2006/0038628 A1 | 2/2006 | Khannur | |
| 2006/0114247 A1 | 6/2006 | Brown | |
| 2006/0125472 A1 * | 6/2006 | Howard et al. | 324/207.24 |
| 2007/0164833 A1 | 7/2007 | Kottschlag | |
| 2008/0106520 A1 | 5/2008 | Free et al. | |
| 2008/0116990 A1 | 5/2008 | Rokhsaz | |
| 2008/0128180 A1 | 6/2008 | Perski et al. | |
| 2008/0142281 A1 | 6/2008 | Geaghan | |
| 2008/0149401 A1 | 6/2008 | Hagen et al. | |
| 2008/0149402 A1 | 6/2008 | Vos | |
| 2008/0150550 A1 | 6/2008 | Vos | |
| 2008/0150658 A1 | 6/2008 | Vos | |
| 2008/0150917 A1 | 6/2008 | Libbey et al. | |
| 2008/0156546 A1 | 7/2008 | Hauck | |
| 2008/0158165 A1 | 7/2008 | Geaghan et al. | |
| 2009/0040193 A1 | 2/2009 | Geaghan | |
| 2009/0134960 A1 | 5/2009 | Larson et al. | |
| 2010/0188832 A1 | 7/2010 | Free et al. | |

FOREIGN PATENT DOCUMENTS

| | | |
|---|---|---|
| DE | 33 42 522 | 6/1985 |
| DE | 298 19 250 | 1/2000 |
| EP | 0 549 956 | 7/1993 |
| EP | 0 607 694 B1 | 3/2000 |
| JP | 59-014043 | 1/1984 |
| JP | 07319601 | 12/1995 |
| JP | 08-179871 | 7/1996 |
| JP | 09-046135 | 2/1997 |
| JP | 10-011206 | 1/1998 |
| JP | 11-024830 | 1/1999 |
| JP | 11-073270 | 3/1999 |
| JP | 11-249798 | 9/1999 |
| JP | 2002-007054 | 1/2002 |
| JP | 2002-297300 | 10/2002 |

| | | |
|---|---|---|
| JP | 2004-062729 | 2/2004 |
| JP | 2004-185153 | 7/2004 |
| KR | 10-0601151 B1 | 7/2006 |
| KR | 10-0601152 B1 | 7/2006 |
| WO | WO 92/08206 | 5/1992 |
| WO | WO 93/08551 | 4/1993 |
| WO | WO 96/18171 | 6/1996 |
| WO | WO 02/103622 | 12/2002 |
| WO | WO 2004/021328 A2 | 3/2004 |
| WO | WO 2004/036147 | 4/2004 |
| WO | WO 2004/040240 A1 | 5/2004 |
| WO | WO 2004/070396 A2 | 8/2004 |
| WO | WO 2006/133159 A2 | 12/2006 |

OTHER PUBLICATIONS

Paul Lorrain and Dale Corson, *Electromagnetic Fields and Waves*, 2d ed. W.H. Freeman and Company of San Francisco, CA (1970), pp. 150-152.

* cited by examiner

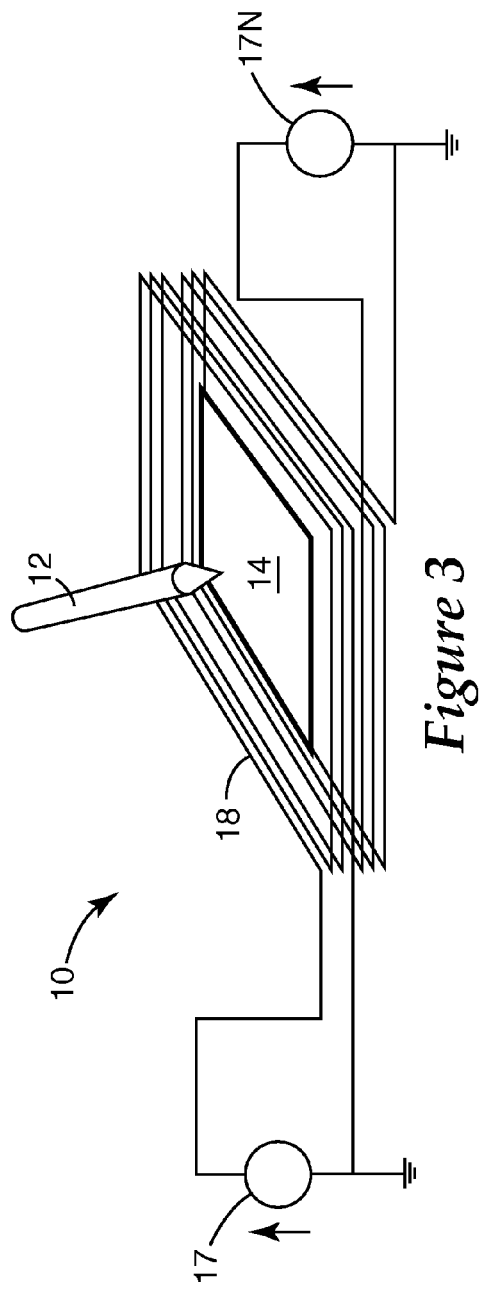
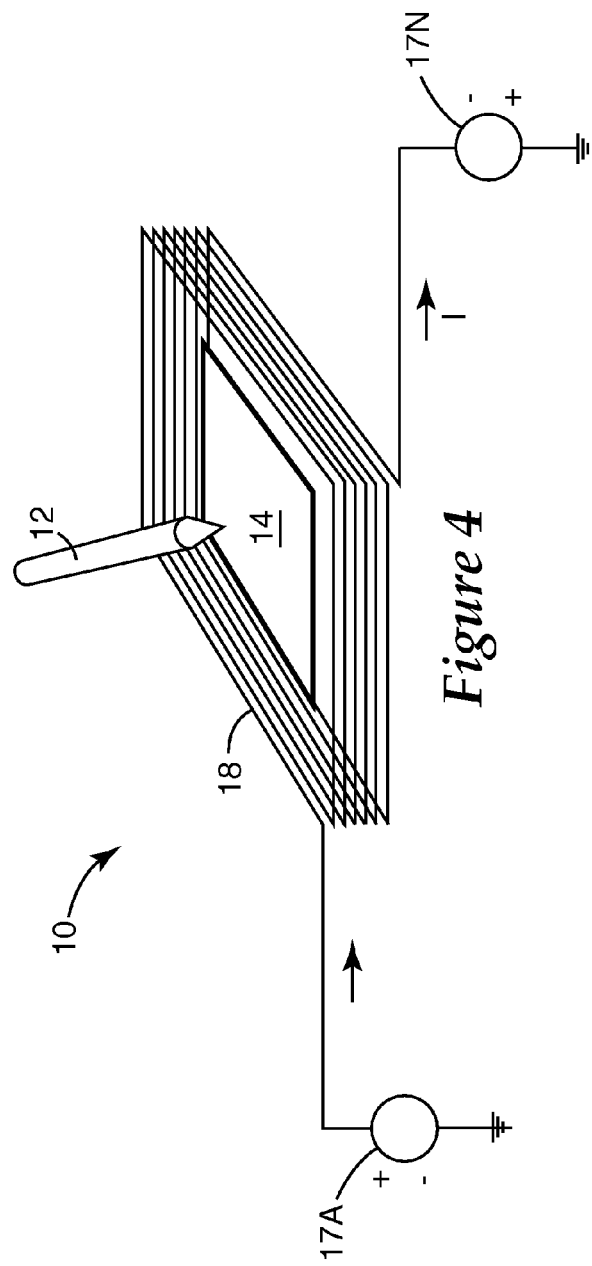

UNTETHERED STYLUS EMPLOYING SEPARATE COMMUNICATION AND POWER CHANNELS

The present invention relates generally to location sensing systems and methods and, more particularly, to location sensing systems and methods that employ an untethered stylus as a user input implement.

BACKGROUND

Personal computing systems of varying type and configuration typically provide one or more user interface devices to facilitate user interaction with such computing systems. Well known user interface devices include a keyboard, mouse, trackball, joystick, and the like. Various types of personal computing devices, such as tablet PCs, provide a pen apparatus that can be manipulated by the user, much in the same way as a pencil or ink pen.

Conventional computing devices that provide for user input via a pen or other pointer implement typically employ an electromagnetic inductive system. The electromagnetic inductive system usually comprises an electromagnetic pen or pointer apparatus and a digitizer in the form of a tablet. Changes in pen location relative to the digitizer's sensing surface are detected and location computations are made to determine the coordinates of the pen.

SUMMARY OF THE INVENTION

The present invention is directed to communicative interaction between an untethered implement and a location sensing device. According to embodiments of the present invention, an untethered stylus is configured to cooperate with a location sensor, such a digitizer. The location sensor is configured to generate a magnetic field comprising a number of frequencies and communicatively couple to the stylus. The stylus may be configured to include a housing having a tip and a shield. Circuitry, which includes a power circuit, is provided in the housing. An antenna arrangement is provided at the housing. The antenna arrangement includes a multiplicity of coil resonant circuits each tuned to a different frequency of the magnetic field.

A first coil resonant circuit is coupled to the power circuit and configured to energize the power circuit in response to the magnetic field. The power circuit is configured to provide DC power to the circuitry when energized. One or more other coil resonant circuits are coupled between the tip and shield of the housing to define separate channels for communicatively coupling the stylus tip and the location sensor. An information signal communicated between the stylus tip and the location sensor is substantially unperturbed during provision of DC power by the first coil resonant circuit.

In some implementations, a first channel of the separate channels may be configured to communicate a stylus position signal, and a second channel of the separate channels may be configured to communicate a stylus status signal. In other implementations, a first channel of the separate channels is configured to communicate a stylus position signal, and a second plurality of the separate channels is configured to communicate a plurality of stylus status signals. The plurality of stylus status signals may include signals representative of a user-initiateable function, a mouse function, a stylus pressure measurement or a stylus tip switch function, for example. A first channel of the separate channels may be configured to communicate both a stylus position signal and a stylus status signal.

In some configurations, one or more of the coil resonant circuits may be configured to capacitively couple to the location sensor. In other configurations, one or more of the coil resonant circuits may be configured to magnetically couple to the location sensor. In further configurations, two or more of the coil resonant circuits may be coupled in series between the tip and shield of the housing. In other configurations, two or more of the coil resonant circuits may be coupled in parallel via coupling circuitry between the tip and shield of the housing.

The power circuit may include an AC-to-DC voltage converter. The antenna arrangement may include inductive coils of the coil resonant circuits that are respectively disposed about a ferrite rod in a spaced relationship. Each of the inductive coils may be coupled in parallel to a respective capacitor.

In accordance with other embodiments, methods of the present invention may be implemented in an untethered stylus for use with a location sensor configured to generate a magnetic drive signal comprising a multiplicity of frequencies. Methods of the present invention may involve receiving the drive signal at the stylus, and generating an AC voltage by each of a plurality of coil resonant circuits of the stylus in response to the magnetic drive signal, each of the plurality of coil resonant circuits tuned to a different frequency of the magnetic drive signal. Methods may further involve converting the AC voltage of a first coil resonant circuit of the plurality of coil resonant circuits to a DC voltage for powering circuitry of the stylus, and generating one or more channels for effecting communication between the stylus and the location sensor using one or more of the plurality of coil resonant circuits other than the first coil resonant circuit.

In some implementations, stylus position information may be communicated between the stylus and the location sensor using the one or more channels. In other implementations, stylus status information may be communicated between the stylus and the location sensor using the one or more channels. In further implementations, stylus position and stylus status information may be communicated between the stylus and the location sensor using the one or more channels. A stylus signal may be modulated, and the modulated stylus signal may be communicated between the stylus and the location sensor using the one or more channels. One or more of the stylus status signals may include one or more of a signal representative of a user-initiateable function, a mouse function, a stylus pressure measurement or a stylus tip switch function.

Generating the one or more channels may involve generating two or more channels for effecting communication between the stylus and the location sensor. Stylus position information may be communicated between the stylus and the location sensor using a first channel of the two or more channels, and stylus status information may be communicated between the stylus and the location sensor using a second channel of the two or more channels.

In some implementations, the generated one or more channels may capacitively couple the stylus and the location sensor. In other implementations, the generated one or more channels may magnetically couple the stylus and the location sensor.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

FIG. 3 is a diagram of an apparatus for generating an excitation magnetic field which is received by a stylus in accordance with embodiments of the present invention;

FIG. 4 is a diagram of another apparatus for generating an excitation magnetic field which is received by a stylus in accordance with embodiments of the present invention;

Figure 1:
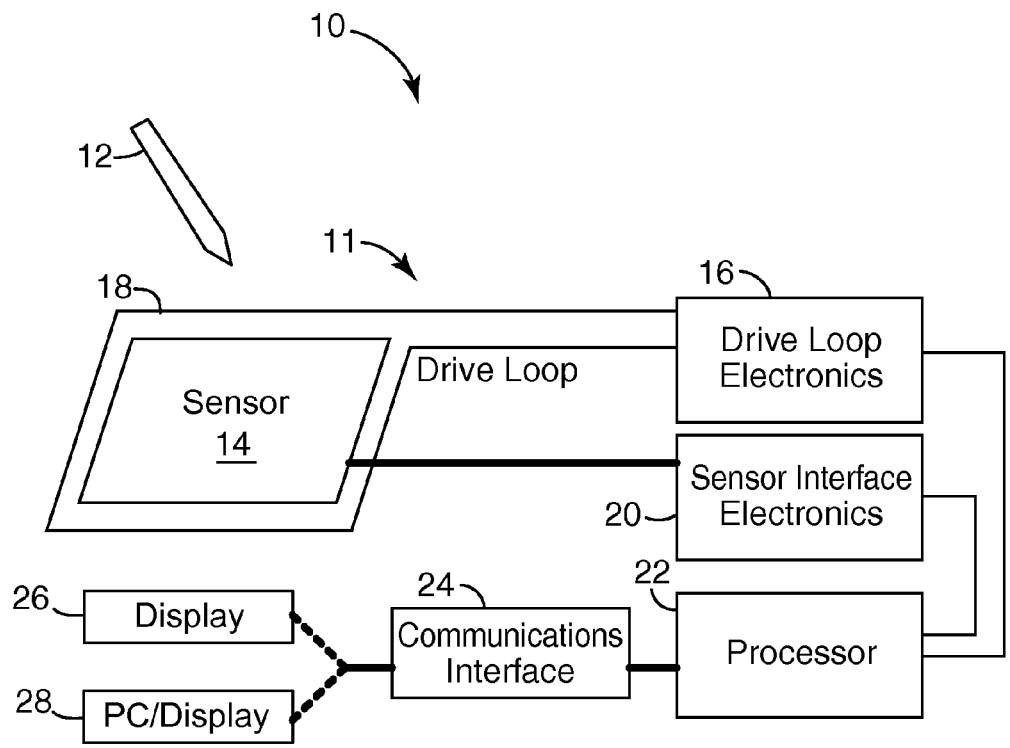
FIG. 1 is a diagram of a location sensing system that includes an untethered stylus and a location sensing device in accordance with embodiments of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF EMBODIMENTS

In the following description of the illustrated embodiments, reference is made to the accompanying drawings which form a part hereof, and in which is shown by way of illustration, various embodiments in which the invention may be practiced. It is to be understood that the embodiments may be utilized and structural changes may be made without departing from the scope of the present invention.

The present invention is directed to methods and systems for communicating information between an untethered stylus and a location sensing system using multiple communication channels. Embodiments of the present invention provide for powering an untethered stylus using a dedicated power channel and communicating information using one or more separate data communication channels, the power and data communication channels established between the untethered stylus and a location sensing system.

Embodiments of the present invention provide for powering circuitry of an untethered stylus and communicating analog and/or digital stylus information between the untethered stylus and a location sensor, such as a digitizer or a touch location sensor in combination with a digitizer, via a continuous or discontinuous magnetic field. An excitation coil arrangement is provided at the location sensor and employed to produce a continuous or discontinuous magnetic field in the plane of the location sensor, the magnetic field comprising multiple harmonics or frequency components.

According to some embodiments, separate data communication channels are established between an untethered stylus and a location sensor, wherein each data communication channel corresponds to one of the harmonics or frequency components of the excitation magnetic field. The independent channels may be used for communication of position or data to and from the untethered stylus and the location sensor. The addition of supplemental channels increases the available communication bandwidth, allowing use of simple and inexpensive modulation schemes. Additional channels allow data communication without disrupting the communication of stylus position.

According to other embodiments, a power channel and one or more data communication channels are established between an untethered stylus and a location sensor. The power channel and each data communication channel corresponds to one of the harmonics of frequency components of the excitation magnetic field.

An untethered stylus according to embodiments of the present invention includes an antenna arrangement comprising multiple resonant circuits that are tuned to resonate at different frequencies of a harmonic magnetic excitation field. In some embodiments, power for the resonant circuits of all data communication channels is derived from the harmonic magnetic field. In other embodiments, power needed for active circuitry of the stylus is derived from a dedicated resonant circuit that is coupled to a power regulator or converter. The power regulator includes an AC-to-DC converter that is used to supply DC power to active circuitry of the stylus. One or more other resonant circuits of the stylus are configured for coupling with the location sensor via separate data communication channels from which stylus proximity and status data may be acquired.

According to embodiments of the present invention, a drive coil or coils provided at a location sensor produce a harmonic magnetic field with two or more frequency components corresponding to two or more coil resonance frequencies of the stylus. The stylus preferably houses two or more inductive coils wrapped around a ferrite cylinder each tuned with a capacitor to resonate at a different frequency of the excitation magnetic field. The stylus coils may be configured for coupling magnetically to detection coils in the location sensor, such as a digitizer. The stylus coils may be coupled in series or parallel (with a coupling circuit) and connected between the stylus shield and the stylus tip. The location sensor, such as a digitizer, is configured to receive the signals coupled to the stylus tip.

A stylus of the present invention may employ two or more coils that may be used for a variety of purposes. The following are illustrative examples of several implementations or uses that can be combined to achieve desired stylus functionality. For example, the magnetic field excitation frequencies may be fixed and one coil of the stylus may be tuned with an inductive or capacitive stylus pressure sensor to produce a phase change detectable at the location sensor. Another coil of the stylus may be tuned to indicate user-actuatable switch closures and produce a phase change detectable at the location sensor. A given coil of the stylus may be used for stylus position detection and tuned with switch closures to produce a phase change detectable at the location sensor.

By way of further example, one magnetic field excitation frequency may be fixed and one magnetic field may be swept over a range of frequencies including the frequency of one stylus resonant coil. The fixed frequency coil may be used for stylus position detection and tuned with switch closures to produce a phase change detectable at the location sensor. The resonance frequency of the swept stylus coil may be tuned with an inductive or capacitive pen pressure sensor. The receiving circuit of the location sensor may be configured to detect the resonance in the swept stylus coil by detecting the frequency at which the voltage is at a maximum.

Further, one magnetic field excitation frequency may be fixed and one magnetic field alternately turned on and off. The constant excitation drive coil may be used for stylus position detection and tuned with switch closures to produce a phase change detectable at the location sensor. The transient excitation stylus coil may be tuned with an inductive or capacitive stylus pressure sensor. The receiving circuit of the location sensor may be configured to detect the resonance in the transient stylus coil by detecting the frequency when the excitation magnetic field is off.

In other embodiments, one or more user-actuatable switches may be configured to change the resonance frequency of stylus circuitry. Frequency control and/or feedback circuitry of the stylus may be used to convey stylus status information in response to the state of one or more stylus switches. For example, an oscillator circuit provided at the stylus may be configured to oscillate at a frequency corresponding to data to be communicated from the stylus. The oscillator circuit may be configured to amplitude modulate a voltage signal at the oscillator frequency. An amplitude demodulator at the location sensor may be configured to demodulate the amplitude modulated signal received from the stylus and to produce a sinusoid at the stylus oscillator frequency. A frequency demodulator at the location sensor may be configured to detect the stylus data. Various forms of amplitude modulation, for example, may be used, preferably with separation of AM modulation frequency from adaptive frequency control bandwidth. A stylus implemented in accordance with embodiments of the present invention may incorporate a low power oscillator of a type disclosed in commonly owned U.S. Patent Application Publication U.S 2008/0150917 (Libby et al.), which is hereby incorporated herein by reference.

Figure 2:
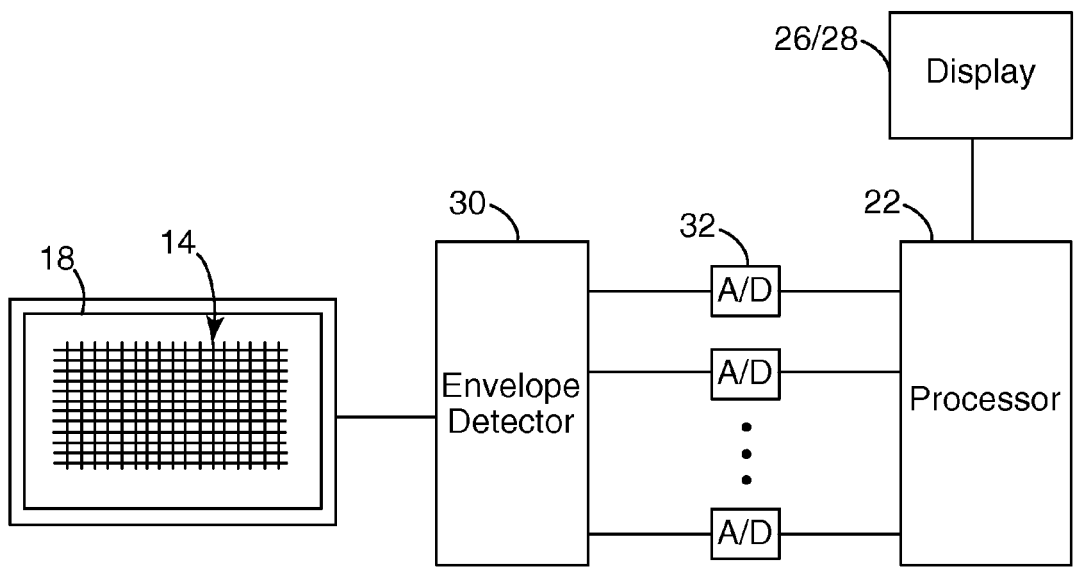
FIG. 2 is a diagram of various components of a location sensing device that cooperates with a stylus in accordance with embodiments of the present invention.

Embodiments of an untethered stylus of the present invention may be implemented in the context of a location sensing system, embodiments of which are illustrated in FIGS. 1 and 2. According to the embodiments shown in FIGS. 1 and 2, a location sensing system 10 includes a stylus 12 that interacts with a sensing device 11. The sensing device 11 includes a location sensor 14, such as a digitizer. The stylus 12 is preferably configured as a tetherless or cordless implement that does not have a battery. Rather, the stylus 12 derives power from a magnetic field generated by the sensing device 11. Although preferred embodiments of an untethered stylus do not include a battery, some embodiments may employ a battery, such as a rechargeable battery that is recharged from energy derived from the magnetic field of the drive signal. A battery may be used to provide power to various circuits of the stylus, such as a modulator or pressure sensor (e.g., tip or eraser pressure sensor).

The sensing device 11 is shown to include one or more drive loops or coils 18 coupled to drive loop electronics 16 that cooperate to generate a magnetic field comprising multiple frequency components. The magnetic field may be a continuous or discontinuous harmonic magnetic field. The stylus 12, having derived power from the magnetic field emanating from the drive coil(s) 18, broadcasts a signal(s) from which stylus location and status may be determined by the sensing device 11.

The stylus 12 is preferably configured to include one or more user-actuatable buttons or switches, such as those commonly employed to implement various mouse functions (e.g., right and left mouse buttons). The tip of the stylus 12 may incorporate a pressure sensor from which applied pressure can be resolved and transmitted to the sensing device 11. Eraser functionality may also be incorporated in the form of a switch or pressure sensor at the stylus end opposite the tip.

Sensor interface electronics 20 is coupled to the sensor 14 and facilitates measurement of signals developed at the sensor 14 in response to signals broadcast by the stylus 12. The sensor interface electronics 20 is preferably connected to the sensor 14 via a shielded connector. The sensor interface electronics 20 includes circuitry for measuring the signal levels present on the individual traces of the sensor 14, and is typically configured to reject as much noise as possible.

According to one configuration, the sensor 14 includes a digitizer that incorporates a detection grid and electronics as is known in the art. For example, such a detection grid may include pairs of position resolving conductors each of which forms one or more differential coil elements in the sensor 14, with each conductor pair receiving a magnetic signal transmitted by the stylus 14. An illustrative example of a digitizer having such a detection grid configuration, elements of which may be employed in a touch location sensor system of the present invention, is disclosed in U.S. Pat. Nos. 4,786,765; 5,218,174; 5,633,471; 5,793,360; 6,667,740; and 7,019,672; which are hereby incorporated herein by reference.

According to another configuration, the sensing device 11 may incorporate a sensor 14 that effectively incorporates a digitizer and a touch-sensitive sensor. The digitizer, according to this configuration, allows the location and status of the stylus 12 to be determined. The touch-sensitive sensor allows the location of a finger touch to be determined. This configuration allows a user to use either the stylus 12 or a finger to indicate a desired location on a computer display, as well as determine the location and status of the stylus 12.

The touch-sensitive sensor 14 typically includes a matrix that capacitively couples to the stylus 12 and/or a finger. In this configuration, the sensor 14 of the sensing device 11 is preferably made up of a series of transparent conductors placed upon a glass or plastic cover that can be placed in front of an LCD display. One side of the glass or plastic sheet has conductors in the X direction, and the opposite side has conductors in the Y direction. Examples of suitable touch-sensitive sensors 14 are disclosed in commonly owned U.S. Pat. Nos. 6,133,906 and 6,970,160, in commonly owned U.S.

Published application No. 2005/0083307, in U.S. Pat. Nos. 6,762,752 and 6,690,156, and in U.S. Published application No. 2004/0095333, each of which is hereby incorporated herein by reference.

An embodiment that incorporates a digitizer and touch-sensitive sensor advantageously allows a user to point a stylus at a computer display and have the location and status of the pointing device determined and, when a finger is used to point at the display device, allows for the determination of the location of a finger touch at the display device. The dual use aspects of this embodiment of a sensing device 11 make it particularly useful in tablet PC applications.

For example, a digitizer arrangement allows a user to use a stylus to input information, indicate operations the user wants to take, and write or draw on the display. The touch-sensitive sensor allows the user to "type" information onto a virtual keyboard on the display screen, for example. This would allow the vendor of the computing system, in which a dual touch location sensor system of the present invention is implemented, to eliminate the keyboard and the associated bulk it requires. It is understood that a digitizer and a touch-sensitive sensor need not be implemented together in all configurations, but inclusion of both sensing devices provides for enhanced user interaction with a computing system that incorporates a sensing system 10 of the present invention.

According to one embodiment, the drive coil or coils 18 may be constructed of wire, such as 36 gauge wire, looped several times (e.g., 4 times) around the periphery of the frame of sensing device 11. In one implementation, the drive coil(s) 18 may have an inductance of about 21 µH and an impedance of about 14 Ohms at 100 kHz. The drive coil(s) 18 is connected to a signal generator of the drive loop electronics 16. The signal generator may be configured to produce multiple periods (e.g., 200) of a sine wave signal at each of a number of different frequencies (e.g., 92 kHz and 163.5 kHz). The signal generator may, for example, produce an output signal of 0.4 $V_{pp}$, resulting in approximately 28 mA of current that flows in the drive coil(s) 18.

FIGS. 3 and 4 are simplified illustrations of a drive coil(s) 18 and signal generators 17A, 17N that cooperate to generate a harmonic magnetic excitation field comprising multiple frequency components. In general, drive coil(s) 18 in the plane of the location sensor 14 provide a harmonic excitation magnetic field at frequencies corresponding to the resonance frequencies of the respective stylus coils.

FIG. 3 illustrates a dual excitation coil approach to harmonic magnetic field generation according to embodiments of the present invention. In this illustrative example, two separate coil loops 18A, 18N are preferably arranged in the plane of the location sensor 14. A sinusoidal current (I=$A_1$*sin($\omega_1$*t)) is produced by a first signal generator 17A with peak magnitude $A_1$ at radian frequency $\omega_1$ and is applied to the rectangular coil 18A. A sinusoidal current (I=$A_2$*sin($\omega_2$*t)) is produced by a second signal generator 17N with peak magnitude $A_2$ at radian frequency $\omega_2$ and is applied to the rectangular coil 18N.

The combination of these drive coils 18A, 18N produces a harmonic magnetic field with radian frequency components at $\omega_1$ and $\omega_2$. Alternatively, and as shown in FIG. 4, a single coil 18 may be driven at each end by voltage sources 17A, 17N with respective harmonic frequencies $\omega_1$ and $\omega_2$. Additional excitation frequencies may be added by increasing the number of coil(s) (e.g., 18A, 18B, 18C, ... 18N) and/or signal generators (e.g., 17A, 17B, 17C, ... 17N).

In general terms, the stylus 12 is configured to collect energy from the magnetic field generated by drive coil 18/drive loop electronics 16 using tank circuitry. The tank circuitry is preferably tuned to resonate at the frequencies that the drive coil(s) 18 are driven. In one illustrative example, the tank circuitry may include two tank circuits set to resonate at 92 kHz and 163.5 kHz, respectively. Each of the resonant tank circuits of the stylus 12 builds amplitude during the burst produced by the drive coil(s) 18 and then gradually loses signal amplitude after the drive coil(s) 18 is turned off. The time associated with the exponential charging and discharging of the resonant tank circuits of the stylus 12 is determined by the capacitive and inductive elements in the tank circuits.

As is shown in FIG. 2, an envelope detector circuit 30 of the sensor interface electronics 20 is configured to detect signals developed on individual traces of the sensor 14. The signals output by the envelope detector circuit 30 are digitized by use of analog-to-digital (A/D) converters 32. Each trace of the sensor 14 may have a dedicated A/D converter 32. Alternatively, two or more traces may share a common A/D converter 32 via a switch having a sufficient switching frequency. The envelope detector circuit 30 is configured to provide sufficient gain to make the resultant signal match the requirements of A/D converters 32. The envelope detector circuit 30 may be configured to generate a signal(s) having the same shape as an imaginary line describing the upper bound of the sensor signal. In such a configuration, the envelope detector circuit 30 effectively transforms each of the stylus signals (e.g., 92 kHz and 163.5 kHz, respectively) into a DC or low frequency signal that is more readily digitized. The envelope detector circuit 30 preferably incorporates one or more synchronous demodulators.

A processor 22 is coupled to the drive loop electronics 16, sensor interface electronics 20, and a communications interface 24, as is shown in FIG. 1. The processor 22 coordinates the operations of drive loop electronics 16 and sensor interface electronics 20, and is configured to determine stylus/finger location and stylus status. Stylus/finger location and stylus status determinations may be made by the processor 22 using known approaches, such as those discussed in the patent references incorporated herein by reference. In one embodiment, processor 22 determines stylus/finger location and stylus status in accordance with the methodologies disclosed in commonly owned U.S. Patent Application Publication US 2008/0106520 (Free et al.), which is incorporated herein by reference.

The location and status information computed by the processor 22 is communicated to a computer and/or display 26 via a communications interface 24. The communications interface 24 may be configured as an RS-232 or USB interface, for example. The processor 22 may be configured to drive a display 26 directly. Alternatively, a computer 28 may be coupled to the communications interface 24 and receive the location and status information from the processor 22, and drive its display. The processor 22 or computer 28 may be configured to control cursor velocity, momentum and other factors to enhance the user experience with the sensing system 11.

Figure 5:
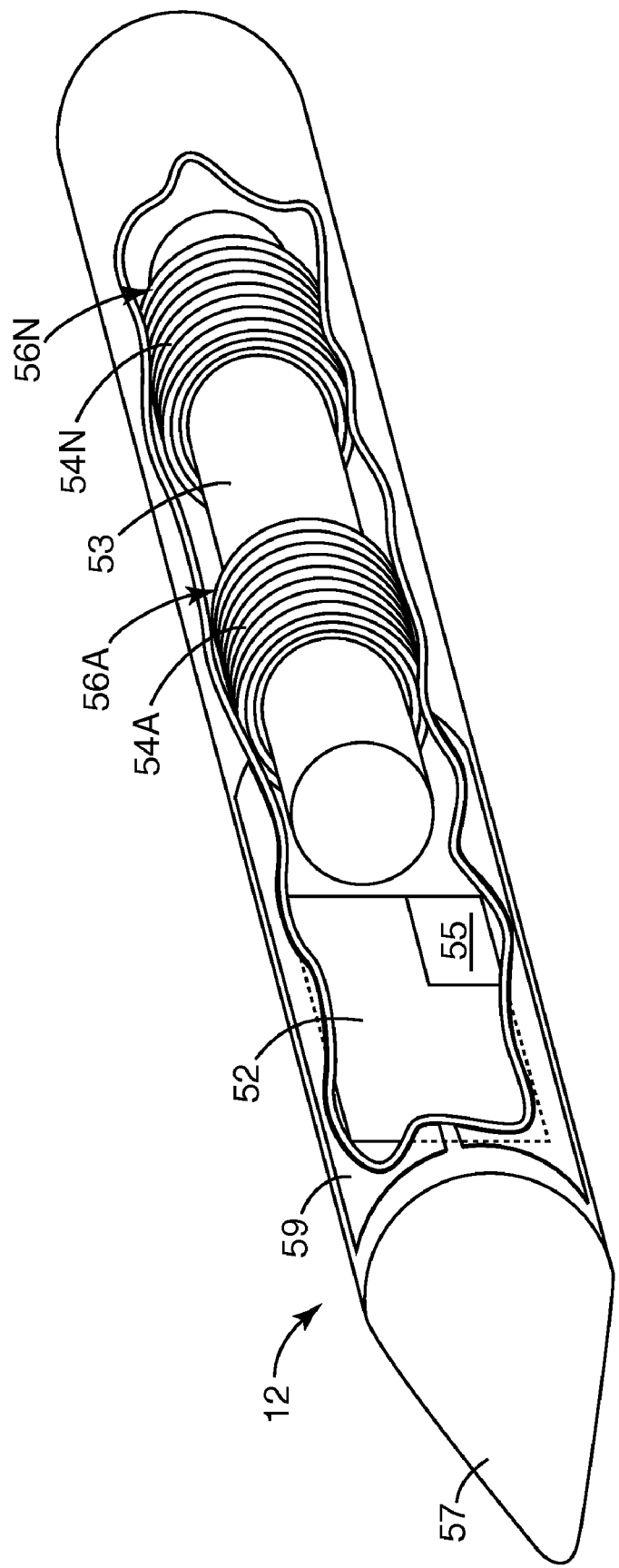
FIG. 5 is an illustration of various components of a stylus implemented in accordance with embodiments of the present invention.

Referring now to FIG. 5, there is shown an embodiment of an untethered stylus 12 of the present invention that may be implemented in the context of a location sensing system as described above or other sensing system known in the art. In accordance with the embodiment shown in FIG. 5, a stylus 12 houses electronics 52, which may include an oscillator circuit 55 (optional), and a multiplicity of coils 54A, 54N wrapped around a ferrite cylinder 53. The ferrite cylinder 53 serves to increase signal amplitude. An applied harmonic magnetic field produced at the surface of the location sensor (e.g., digitizer) or a display, for example, couples flux through the ferrite cylinder 53 and thus to the coils 54A, 54N when the stylus 12 is placed in the applied field.

In one implementation, the coils 54A, 54N may be configured as 315 turn coils each having a length of about 4.5 mm. The coils 54A, 54N may be spaced about 11 mm apart on the ferrite cylinder 53. The ferrite cylinder 53 may have a length of about 25 mm with a relative permeability of about 2300. Each of the coils 54A, 54N is coupled to additional circuitry, such as that shown in FIGS. 6-9, to define resonant circuits.

It is understood that more than two coils 54 may be provided in stylus 5 to provide a corresponding number of data communication channels or a combination of data communication channels and a power channel. The magnetic coupling between the coils 54A, 54N, however, must be kept relatively low. It is not considered practical to have separate resonance conditions associated with the two or more coils 54A, 54N when the magnetic coupling is relatively high. Low coupling may be accomplished by separating the coils 54A, 54N on the ferrite cylinder 53 so that most of the magnetic flux lines associated with one coil's current do not pass through the second coil. Experiments have demonstrated good results with a dual coil arrangement with a coupling of approximately 28%.

In general, each of the ferrite coil arrangements 56A, 56N resonates with a separate parallel-connected capacitor arrangement of electronics 52, and each is tuned to a different excitation field frequency. In some embodiments, two or more parallel coil-capacitor combinations associated with a corresponding number of coils 54A, 54N are connected (in series or parallel) between the stylus tip 57 and the stylus shield 59 to define a corresponding number of data communication channels.

In other embodiments, one parallel coil-capacitor combination associated with one coil 54A, 54N is connected to a power regulation circuit to define a power channel. One or more other parallel coil-capacitor combinations associated with other coils 54A, 54N is/are connected (in series or parallel) between the stylus tip 57 and the stylus shield 59 to define one or more data communication channels.

The shield 59 may form part of, or otherwise be connected to, the stylus housing so that it can be touched, and therefore grounded, by a user's hand when held. The shield 59 may be situated to extend over the circuitry region of the stylus 12, and preferably has a discontinuous shape, such as a "C" shape, so as to avoid eddy currents that could otherwise arise in a closed loop shield arrangement.

The stylus tip 57 couples capacitively to the location sensor from which location information is derived. To provide stylus status information according to embodiments of the present invention, stylus status and changes thereof may be detected by observing a change in phase of the stylus transmitted frequency or though a transient frequency change caused when the drive coil current is turned off.

According to other embodiments, at least one of the ferrite coil arrangement 56A, 56N powers the electronics 52, which may include a low power oscillator or oscillators provided on oscillator circuit 55. The oscillator(s) provided on oscillator circuit 55 are typically configured to amplitude modulate the stylus tip voltage at the oscillator(s) frequency or frequencies. The frequency of the oscillations is changed to reflect the stylus status, such as switch closures or tip pressure changes.

In other embodiments, the invention may be implemented with magnetic-sensing digitizer systems as are known in the art. An untethered magnetic stylus is similar to the capacitive stylus shown in FIG. 5, except the resonant circuit comprising ferrite coil arrangement 56 and separate parallel-connected capacitor of the electronics 52 need not be connected to tip 57 nor to a shield 59. Untethered magnetic styluses are well known in the art, and are described in previously incorporated U.S. Pat. Nos. 4,786,765; 5,633,471; 5,793,360; 6,667,740, and 7,019,672. Embodiments of the present invention that are implemented using an untethered magnetic stylus may employ a location sensor that includes multiple drive loops as disclosed in the referenced patents. In such embodiments, a separate sensing grid and separate drive loops need not used. Rather, each of the drive loop coils is alternately coupled to transmitting circuitry and then to receiving circuitry to alternately transmit and receive from one of multiple drive loop coils that are placed in the active area, typically under the display.

Figure 6:
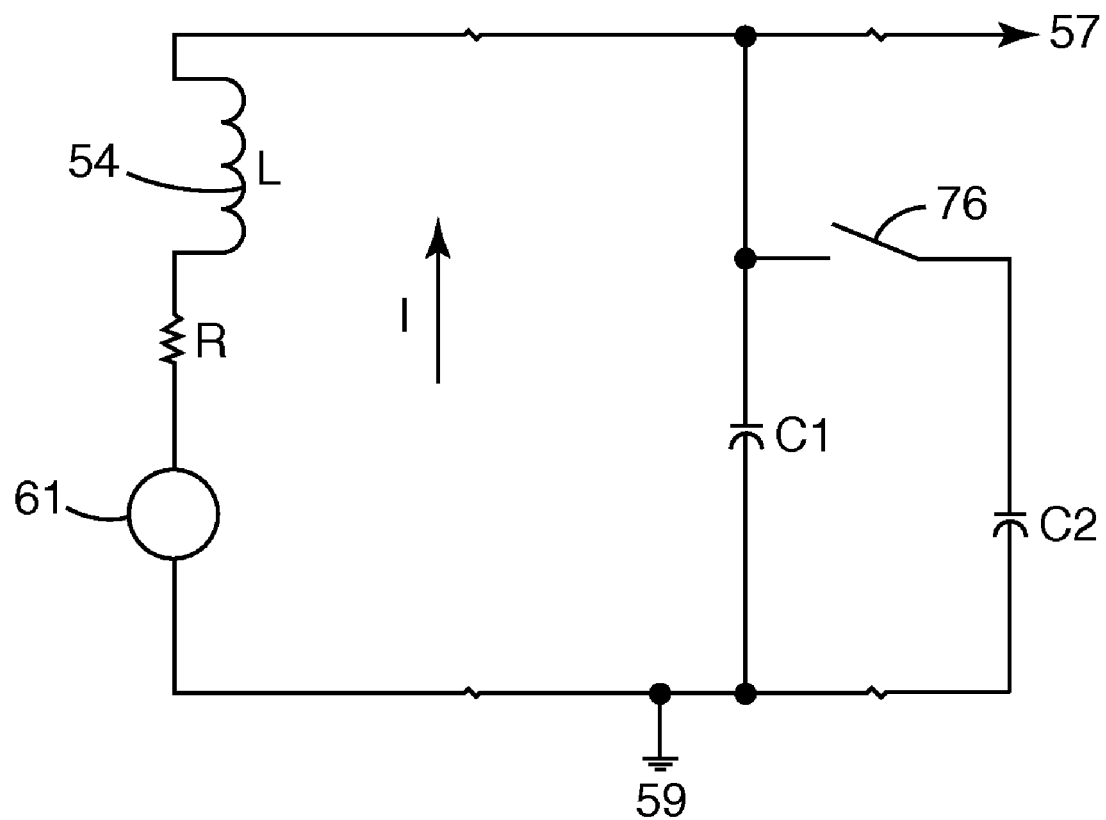
FIG. 6 shows a schematic model of a parallel coil-capacitor circuit that may be implemented in a stylus in accordance with embodiments of the present invention.

FIG. 6 shows a schematic model of a parallel coil-capacitor circuit that may be implemented in a stylus in accordance with embodiments of the present invention. FIG. 6 shows a capacitor C1 connected in parallel with a coil 54 that defines a coil-capacitor resonant circuit configured to resonate at an excitation frequency or a transmitted frequency. The voltage developed across the coil 54, which is shown modeled as voltage generator 61, is coupled to the stylus tip 57 and then capacitively coupled to the location sensor, such as sensor 14 shown in FIG. 1. The voltage developed across the resonating coil 54 is modulated with one or a combination of the techniques discussed herein. An added ferrite cylinder 53 about which coil 54 is preferably wrapped, as shown in FIG. 5, has the effect of increasing the magnetic flux B and signal coupled by the drive coil of the location sensor to the receiving coil 54 of the stylus 12.

The capacitance value of capacitor C1 shown in FIG. 6 is selected such that the capacitance, C, of capacitor C1 resonates with the coil inductance, L, at an excitation angular frequency $\omega$ so that there is no voltage drop across the LC combination. Two different voltages in this circuit can be considered. The first voltage of consideration is the voltage V (shown in terms of voltage source 61) that develops across the coil 54 through magnetic induction. It is well understood that this voltage 61 is basically equal to the number of stylus coil turns N times the coil cross section A times the rate of change of the magnetic flux density passing through the ferrite cylinder, which is given by $V = N*A*dB/dt$.

The second voltage of consideration is the voltage that develops across the capacitor C1. This voltage $V_C$ is also the stylus tip voltage. From basic circuit analysis at resonance, it follows that: $V_C = V/(\omega RC) = V(\omega L/R)$ with the quantity $1/(\omega RC) = (L\omega)/R$ defined as the resonant circuit quality factor Q, where $\omega$ is expressed in terms of radians per second. As will be discussed below, this second voltage may be modulated for purposes of communicating stylus status data to a location sensor according to embodiments of the present invention.

With continued reference to FIG. 6, one approach to transmitting stylus status information in addition to stylus position information is through addition of a second capacitor C2 connected to the first capacitor C1 through a switch 76. Opening and closing the switch 76 causes the resonance frequency of the coil-capacitor combination 54/C1 to change. This change may be detected by observing a change in phase of the stylus transmitted frequency or though a transient frequency change caused when the drive coil current is turned off. Alternatively, it is possible to turn off and on the connection to the stylus thus providing a sequence of bits representing a digital information. Other approaches may be implemented to provide this communication. For example, similar schemes may be used to communicate data or timing information from the location sensor to the stylus.

Because many of such data communication methods involve the frequencies associated with the position detection scheme implemented by the location sensor, these techniques may interfere with the detection of the position information and require, and it may be desirable to add circuitry to reduce the interference. Embodiments that incorporate an oscillator of a type described herein that employ frequency modulation of an amplitude-modulated signal removes these difficulties, as it is practical to demodulate the amplitude modulation and detect the frequency of the modulation without having to turn off the excitation coil and in the presence of varying phase.

Figure 7:
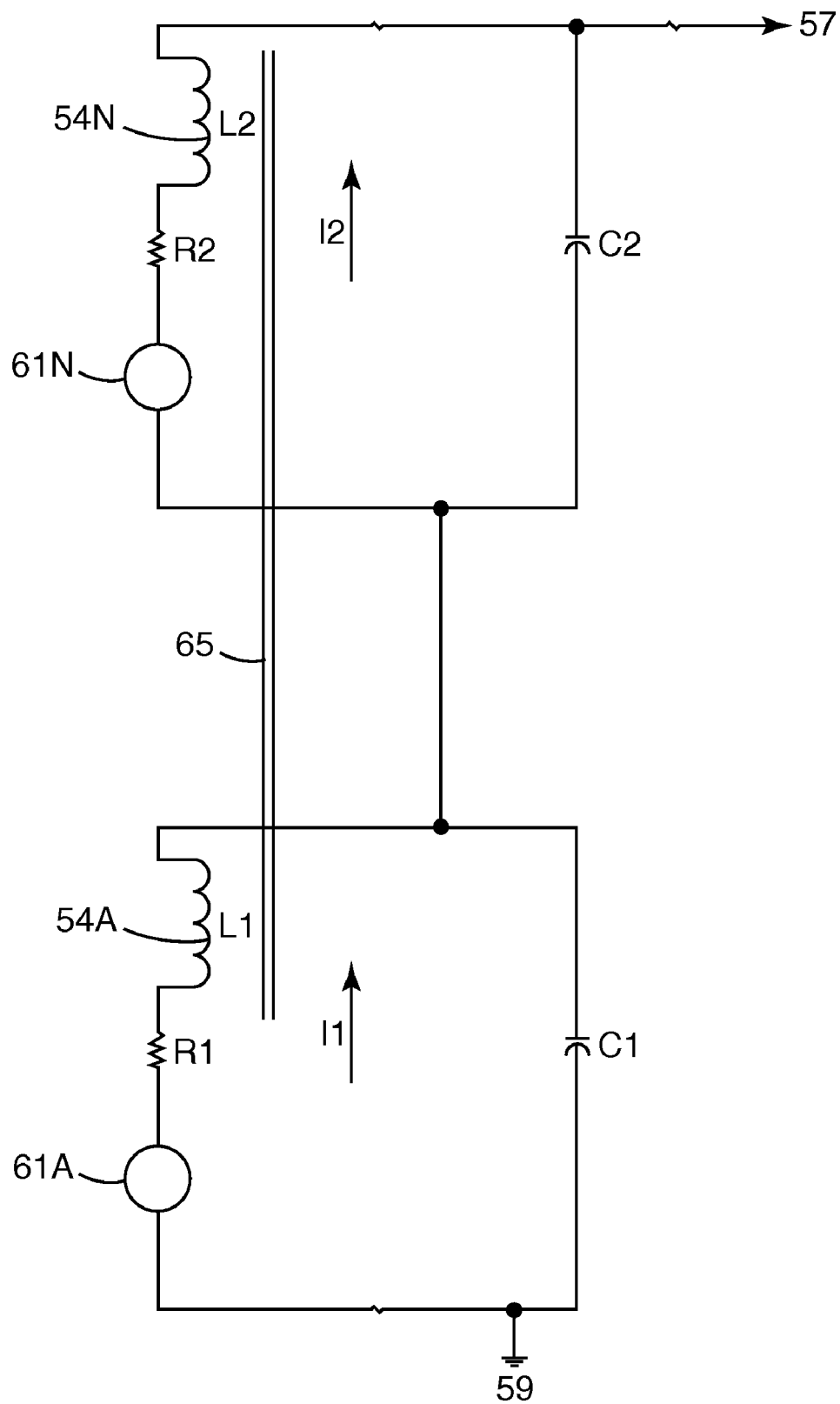
FIG. 7 shows a schematic model of a multiplicity of coil-capacitor resonant circuits connected in series that may be implemented in a stylus to effect communication of stylus information for detection by a location sensor in accordance with embodiments of the present invention.
Figure 8:
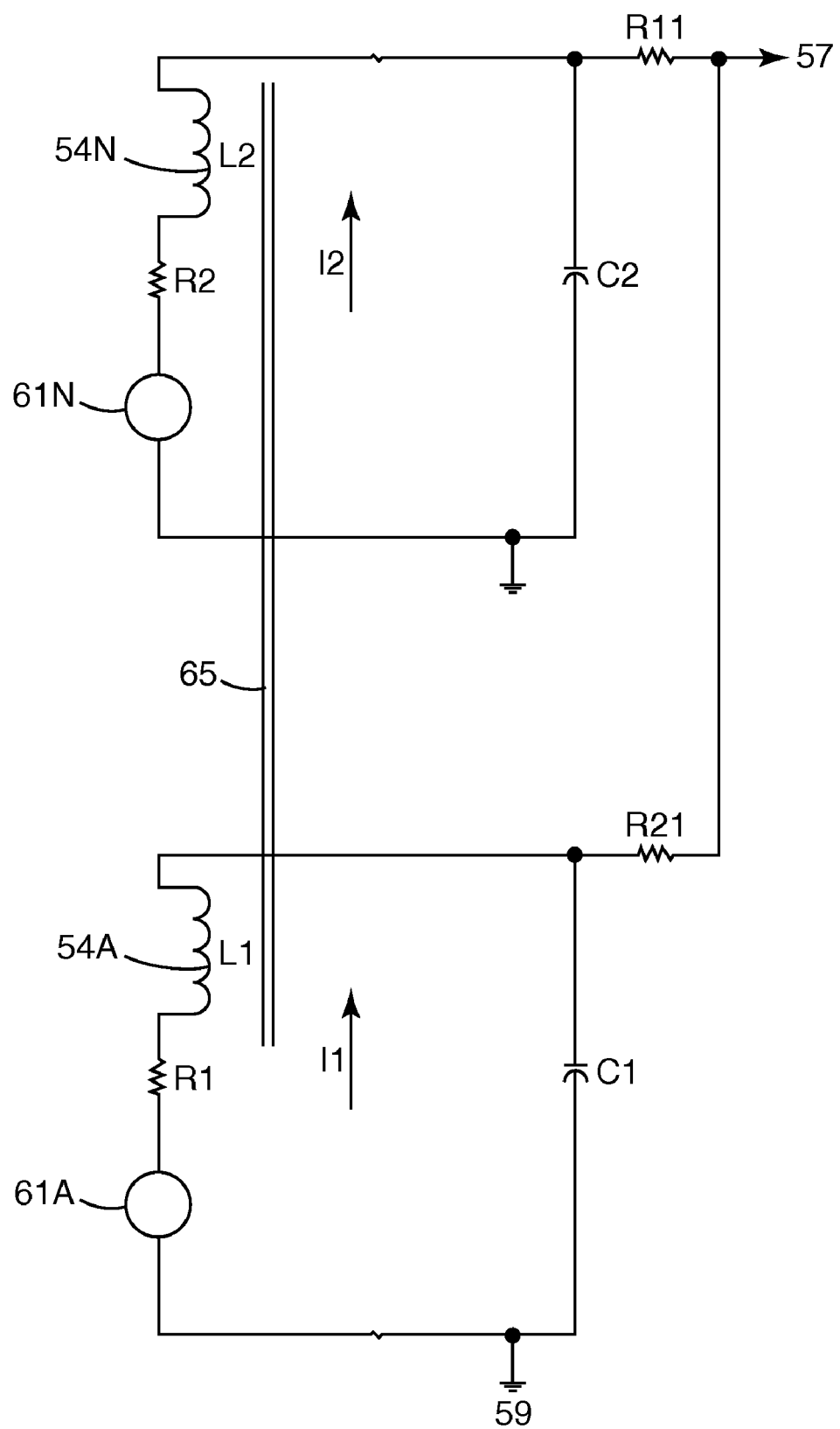
FIG. 8 shows a schematic model of a multiplicity of coil-capacitor resonant circuits connected in parallel that may be implemented in a stylus to effect communication of stylus information for detection by a location sensor in accordance with embodiments of the present invention.
Figure 9:
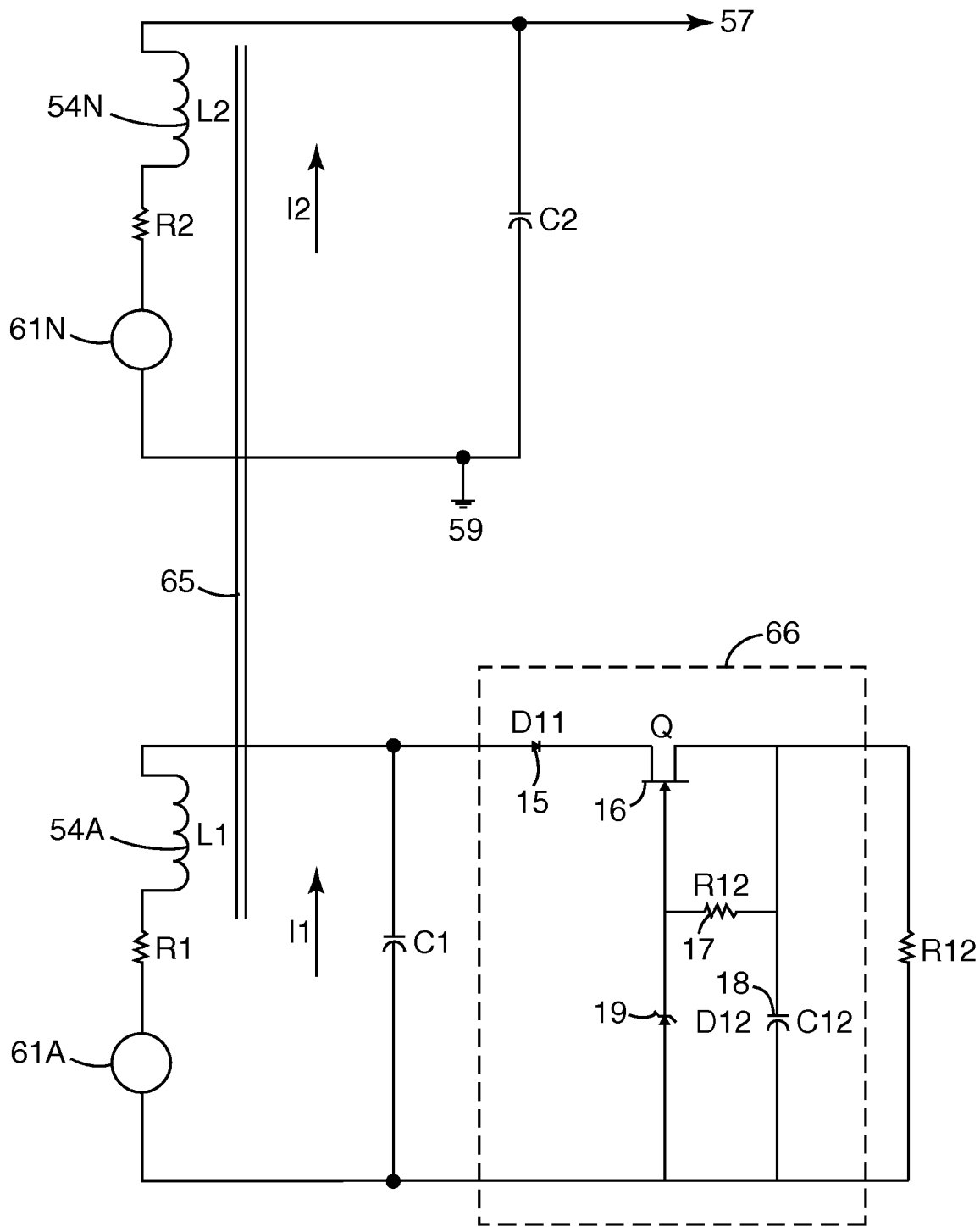
FIG. 9 shows a schematic model of a multiplicity of coil-capacitor resonant circuits connected in series, at least one of the coil-capacitor resonant circuits configured to provide power for electronics of the stylus, and one or more other coil-capacitor resonant circuits configured to effect communication of stylus information for detection by a location sensor in accordance with embodiments of the present invention.

Various dual coil stylus configurations are shown in FIGS. 7-9. Dual coils are illustrated in FIGS. 7-9 for purposes of clarity, and it is understood that more than two coils may be implemented in a stylus to provide for a multiplicity of data communication channels and, if desired, a dedicated power channel. FIGS. 7 and 8 illustrate two configurations of a dual coil stylus that provide for two frequency-separated data communication channels. FIG. 9 illustrates a dual coil stylus configuration that includes a dedicated power channel and a single data communication channel. As was discussed previously, this single data communication channel may be used to effect communication of one or both of stylus tip proximity and stylus status (i.e., one type or multiple types of information communicated via a single data communication channel).

FIGS. 7-9 show different coil stylus configurations that include circuitry of the type previously described with reference to FIG. 6. Each of these configurations includes coils 54A, 54N that are respectively coupled to a circuit of the type shown in FIG. 6. The operation of these circuits is essentially the same as that described above with reference to FIG. 6, and is generally applicable to the operation of the circuitry shown in FIGS. 7-9. These circuits differ somewhat from that shown in FIG. 6, as there is magnetic coupling 65 from one coil 54A to the other 54N.

FIG. 7 shows the circuitry for the two coils 54A, 54N connected in series between the stylus tip 57 and stylus shield 59. In FIG. 7, there are two circuits with the form shown in FIG. 6, but they are connected in series and there is magnetic coupling 65 between the coils 54A, 54N. Alternatively, the circuits for coils 54A, 54N may be connected in parallel with a coupling circuit to the stylus tip 57. This configuration is shown in FIG. 8. The coupling circuit includes the combination of resistors R11 and R21.

As was discussed previously, it is desirable to reduce magnetic coupling between coils 54A, 54N, which may be accomplished by separating the coils 54A, 54N on the ferrite cylinder so that most of the magnetic flux lines associated with one coil's current do not pass through other coils. It is noted that the voltage sources 61A, 61N generate a voltage basically equal to the number of stylus coil turns N times the coil cross section A times the rate of change of the magnetic flux density passing through the ferrite cylinder, which is given by $V_1 = N_1 * A * dB/dt$ for voltage source 61A and $V_N = N_N * A * dB/dt$ for voltage source 61N, where the number of coil turns $N_1$ and $N_N$ may be equal or different.

FIG. 9 illustrates circuitry of a dual coil stylus that includes a dedicated power channel and a single data communication channel, it being understood that more than one data communication channel may be included. An untethered stylus according to embodiments of the present invention may incorporate a power source that provides power for electronics of the stylus but does not interfere with the communication of stylus position and/or data information. In certain stylus configurations, extraction of power from frequency sensitive circuitry of the stylus can reduce and/or distort the stylus position signal level and interfere with the transmission of the stylus data signal. In accordance with the embodiment of FIG. 9, an independent power source for the stylus provides stylus circuit power without disrupting the communication of stylus position or data.

As is shown in FIG. 9, one of the parallel coil-capacitor combinations that includes coil 54N and voltage source 61N is connected between the stylus tip and the stylus shield 59. The stylus tip 57 then couples capacitively to a location sensor to provide position and/or stylus status information in a manner previously described.

A second parallel coil-capacitor combination that includes coil 54A and voltage source 61A is connected to a power regulator or conversion circuit 66 configured to derive power from the excitation magnetic field. The power circuit 66 shown in FIG. 9 includes a rectifier-capacitor combination that effectively operates as an AC-to-DC converter to provide DC power for stylus electronics, which is denoted by stylus power load R12 in FIG. 9.

In many applications, it may be desirable to obtain a stable DC voltage derived from an arbitrary AC voltage of high amplitude, as exists in untethered styluses that are inductively coupled to a nearby drive coil. A variety of suitable AC-to-DC converters can be implemented for incorporation in untethered styluses and other devices. Such AC-to-DC converters typically include Zener diodes to provide DC voltage stabilization. The power conversion circuit 66 shown in FIG. 9, for example, represents one such implementation that incorporates a Zener diode to provide DC voltage stabilization.

Although DC voltages can be stabilized using Zener diodes, such implementations can result in excess current being used for charging of a capacitor and diverted as a discharging current. A power converter according to embodiments of the present invention may be implemented to provide a stabilized DC voltage derived from an arbitrary AC voltage without use of a Zener diode. Eliminating Zener diodes from power converter circuitry according to embodiments of the present invention advantageously saves valuable current by stopping the charging process instead of starting the discharge process.

Figure 10:
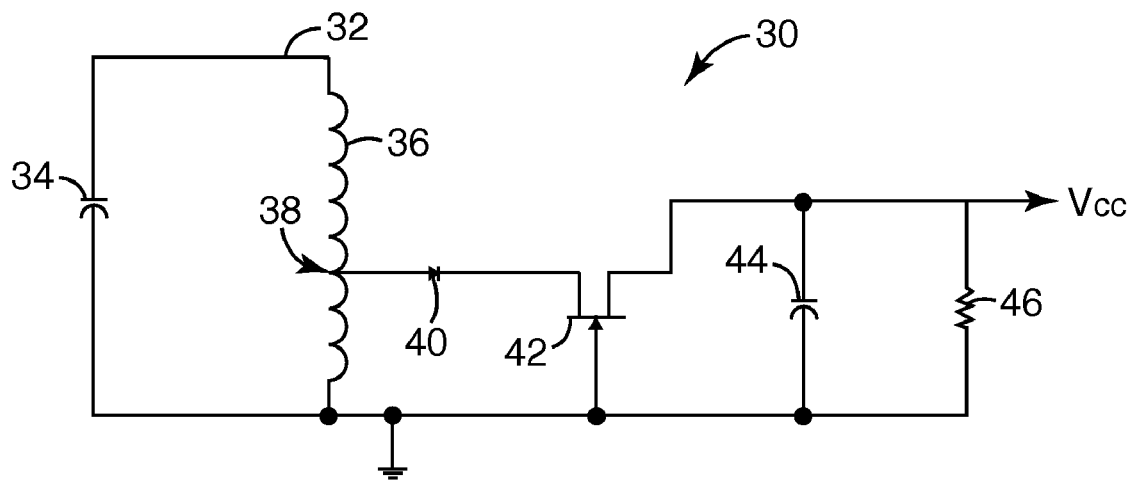
FIG. 10 is a schematic of a power converter circuit that does not employ a Zener diode in accordance with embodiments of the present invention.

FIG. 10 is a schematic of a power converter circuit that does not employ a Zener diode in accordance with embodiments of the present invention. A power converter of the type shown in FIG. 10 may be implemented in a wide range of applications, including use in untethered styluses, such as those described herein. The following discussion provides illustrative examples of a power converter circuit of the type shown in FIG. 10 implemented in an untethered stylus that is energized by a magnetic field generated by a drive coil apparatus of a location sensing device. It is understood that a power converter according to the present invention can be used in many applications other than in those described herein.

The power converter 30 shown in FIG. 10 provides a DC voltage ($V_{cc}$) derived from an arbitrary AC resonating coil voltage. As discussed previously, the DC voltage $V_{cc}$ may be stabilized using a parallel Zener diode over the source capacitor. This approach, however, shorts excess charge to ground so that the source capacitor voltage does not exceed a certain value. This approach may be wasteful, in that the shorted Zener current does not benefit the circuitry that $V_{cc}$ is supposed to drive.

In the context of AC-to-DC power conversion within an untethered stylus, it is desirable to minimize wasted current because of the limited available current budget. Instead of starting to discharge the source capacitor through a Zener diode after a certain voltage is reached, it may be desirable to stop charging the source capacitor when this voltage level has been reached, which is achieved by the power converter implementation shown in FIG. 10.

The power converter circuit 30 shown in FIG. 10 includes a coil-capacitor resonant circuit 32 implemented using a coil or inductor 36 coupled in parallel with a capacitor 34. The anode of diode 40 is coupled to the coil 36 of the coil-capacitor resonant circuit 32 at a tap location 38. The cathode of the diode 40 is coupled to the drain of a transistor 42. The source of the transistor 42 is coupled to one node of a parallel connected capacitor 44 and resistor 46 combination. The gate of the transistor 42 and the other node of the parallel connected capacitor 44 and resistor 46 are respectively coupled to ground. The DC voltage $V_{CC}$ is provided at the first node of the parallel connected capacitor 44 (i.e., the DC charged capacitor) and resistor 46 combination.

According to one implementation, the transistor 42 shown in FIG. 10 is preferably an N-channel depletion JFET that has the property of having a negative gate source voltage, $V_{gs}$, as the threshold or pinch-off voltage. Thus, the JFET transistor 42 is normally open, so that the capacitor 34 always gets charged when a small AC voltage develops across the coil 36. As soon as the voltage of capacitor 34 approaches the threshold voltage, $V_{gs}$, of the transistor 42, the drain ($I_D$)/source ($I_S$) current is reduced to zero, so that the capacitor voltage is clamped to near the threshold voltage, $V_{gs}$. A modest load of about 1 MΩ for resistor 46 is sufficient to keep the capacitor voltage from increasing further because of a small leakage source current that may exist.

When the DC voltage $V_{cc}$ is used to drive additional circuitry, such as MOS circuitry, the value of the threshold voltage, $V_{gs}$, is typically not critical and can be anywhere between roughly −5 and −10 V. A suitable JFET for use as transistor 42 shown in FIG. 10 is the 2N5432 JFET available from Vishay Siliconix. According to other implementations, a MOSFET with similar ratings could serve equally as well.

As is shown in FIG. 10, the anode of diode 40 is coupled to the coil 36 at a tap location 38. The tap location 38 is preferably selected as a location that prevents the drain-gate voltage, $V_{dg}$, from exceeding the maximum specification, such as a specified maximum of 20 V. The diode 40 is included in the implementation shown in FIG. 10 to prevent clamping of the coil voltage to a diode voltage drop of a forward biased gate-drain junction in case the coil voltage reverses polarity.

Figure 11:
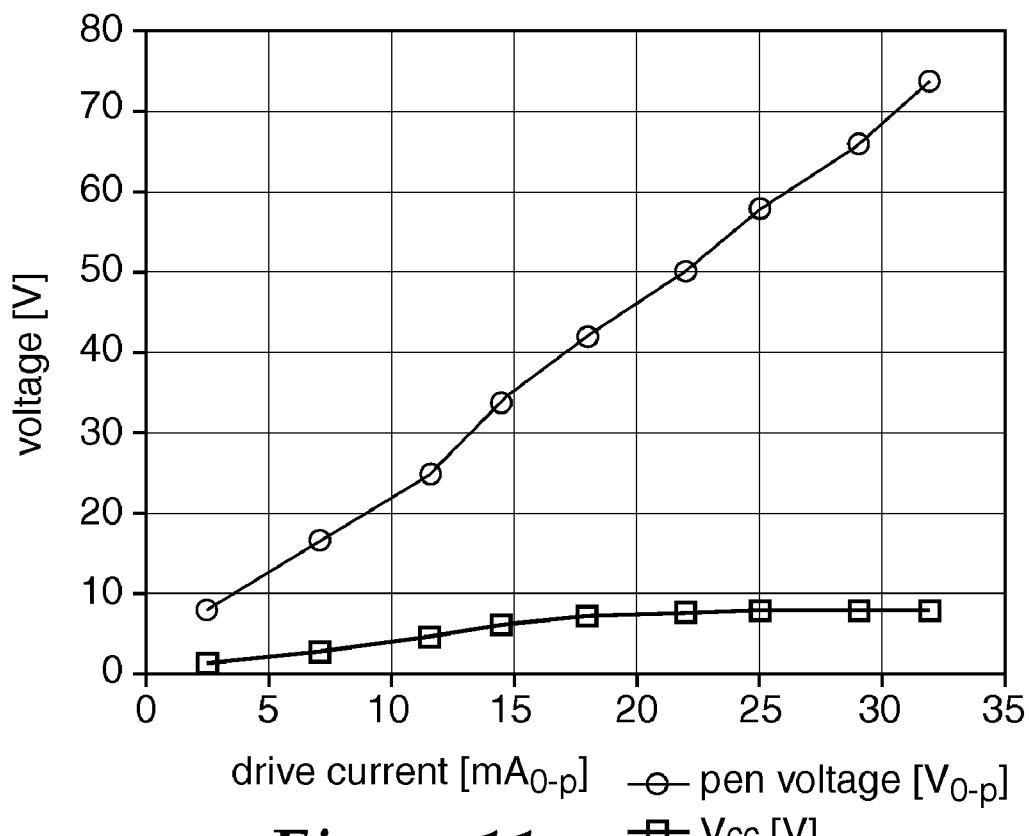
FIG. 11 is a plot showing a comparison of stylus coil voltage and stable $V_{CC}$ voltage as a function of drive current through a nearby inductively coupled drive loop, the plot demonstrating provision of a substantially stable DC voltage, $V_{CC}$, in response to a relatively high AC induced coil voltage of increasing amplitude.

The plot of FIG. 11 is a comparison of stylus coil voltage (indicated as stylus voltage [V0-p] and stable $V_{CC}$ voltage (indicated as $V_{CC}$ [V]) as a function of drive current through a nearby inductively coupled drive loop. FIG. 11 demonstrates provision of a substantially stable DC voltage, $V_{CC}$, at the output of the power converter circuit 30 in response to a relatively high AC induced coil voltage of increasing amplitude. The measured results reflected in FIG. 11 were obtained using the circuit in FIG. 10. The measurement was performed at a frequency of about 96 kHz with the coil 36 inductively coupled to a nearby drive coil. The curves of FIG. 11 show that the DC voltage, $V_{cc}$, voltage is indeed stable when the stylus coil voltage continues to increase above about 20 $V_{0-p}$.

Figure 12:
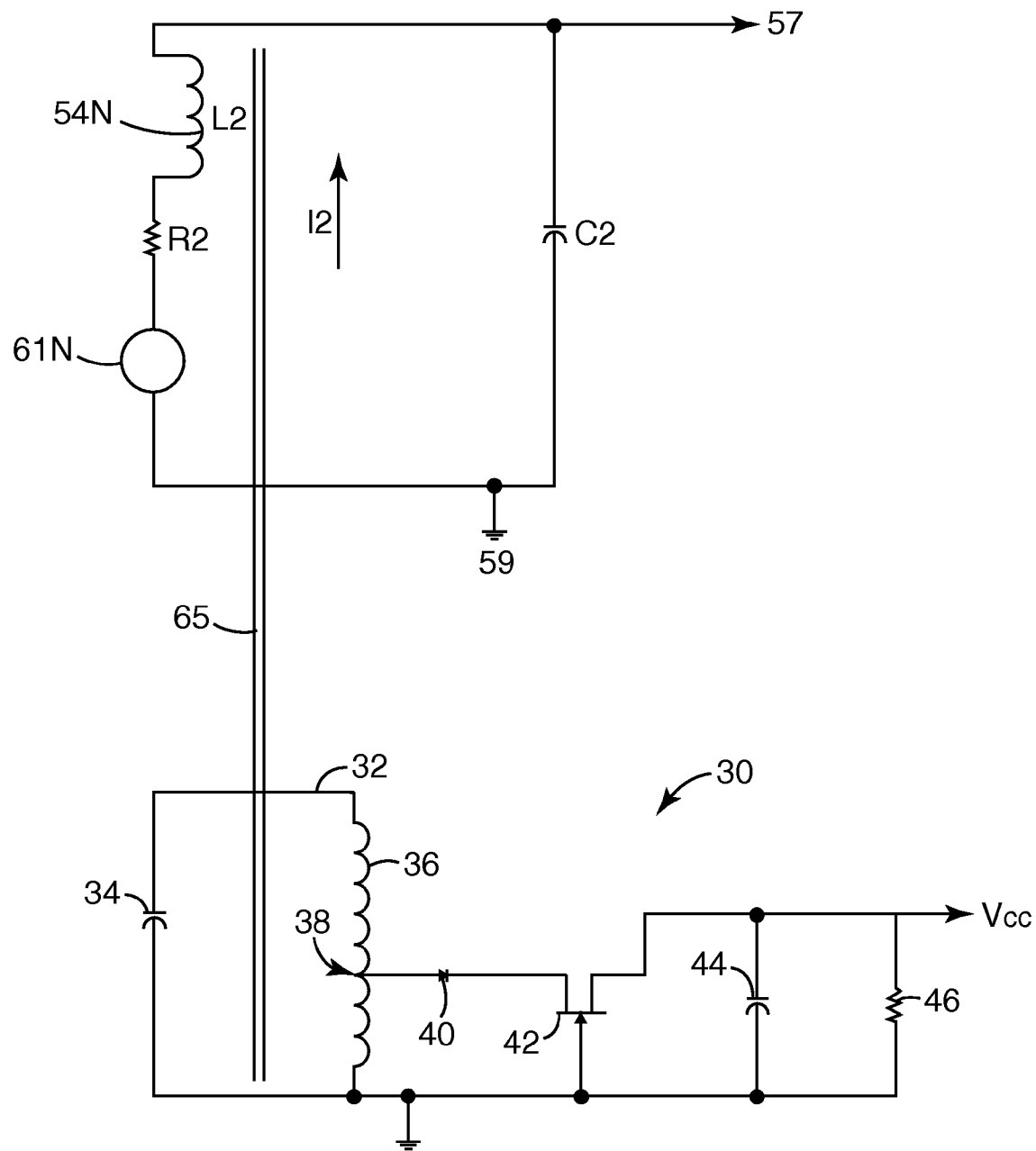
FIG. 12 illustrates circuitry of a dual coil stylus that includes a dedicated power channel that incorporates the power converter circuitry of FIG. 10 and a single data communication channel in accordance with embodiments of the present invention.

FIG. 12 illustrates circuitry of a dual coil stylus that includes a dedicated power channel that incorporates the power converter circuitry of FIG. 10 and a single data communication channel, it being understood that more than one data communication channel may be included. An untethered stylus according to embodiments of the present invention may incorporate a power source that provides power for electronics of the stylus but does not interfere with the communication of stylus position and/or data information. In accordance with the embodiment of FIG. 12, an independent power source for the stylus provides circuitry of the stylus with a stable DC supply voltage, $V_{CC}$, without disrupting the communication of stylus position or data.

As is shown in FIG. 12, one of the parallel coil-capacitor combinations that includes coil 54N and voltage source 61N is connected between the stylus tip and the stylus shield 59. The stylus tip 57 then couples capacitively to a location sensor to provide position and/or stylus status information in a manner previously described.

A second parallel coil-capacitor combination that includes coil 36 and capacitor 34 is connected to a power regulator or conversion circuit 30 configured to derive power from the excitation magnetic field and provide a stable DC supply voltage, $V_{CC}$, for circuitry of the stylus. The power circuit 30 shown in FIG. 12 is essentially that shown in FIG. 10 and described in the accompanying text.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An untethered stylus configured to cooperate with a location sensor, the location sensor configured to generate a magnetic field comprising a plurality of frequencies and communicatively couple to the stylus, the stylus comprising:
   a housing comprising a tip and a shield;
   circuitry provided in the housing and comprising a power circuit; and
   an antenna arrangement comprising:
      a plurality of coil resonant circuits each tuned to a different frequency of the magnetic field and each coupled to the stylus tip;
      a first coil resonant circuit of the plurality of coil resonant circuits coupled to the power circuit and configured to energize the power circuit in response to the magnetic field, the power circuit configured to provide DC power to the circuitry when energized; and
      one or more other coil resonant circuits of the plurality of coil resonant circuits coupled between the tip and shield of the housing to define separate channels for communicatively coupling the stylus tip and the location sensor, wherein an information signal communicated between the stylus tip and the location sensor is substantially unperturbed during provision of DC power by the first coil resonant circuit.

2. The stylus of claim 1, wherein a first channel of the separate channels is configured to communicate a stylus position signal, and a second channel of the separate channels is configured to communicate a stylus status signal.

3. The stylus of claim 1, wherein a first channel of the separate channels is configured to communicate a stylus position signal, and a second plurality of the separate channels is configured to communicate a plurality of stylus status signals.

4. The stylus of claim 3, wherein the plurality of stylus status signals comprises signals representative of a user-initiateable function, a mouse function, a stylus pressure measurement or a stylus tip switch function.

5. The stylus of claim 1, wherein a first channel of the separate channels is configured to communicate both a stylus position signal and a stylus status signal.

6. The stylus of claim 1, wherein one or more of the coil resonant circuits are configured to capacitively couple to the location sensor.

7. The stylus of claim 1, wherein one or more of the coil resonant circuits are configured to magnetically couple to the location sensor.

8. The stylus of claim 1, wherein two or more of the coil resonant circuits are coupled in series between the tip and shield of the housing.

9. The stylus of claim 1, wherein two or more of the coil resonant circuits are coupled in parallel via coupling circuitry between the tip and shield of the housing.

10. The stylus of claim 1, wherein the power circuit comprises an AC-to-DC voltage converter.

11. The stylus of claim 1, wherein the antenna arrangement comprises inductive coils of the plurality of coil resonant circuits respectively disposed about a ferrite rod in a spaced relationship.

12. The stylus of claim 1, wherein each of the inductive coils is coupled in parallel to a respective capacitor.

13. A method implemented in an untethered stylus for use with a location sensor configured to generate a magnetic drive signal comprising a plurality of frequencies, the stylus comprising a stylus tip, and the method comprising:

receiving the magnetic drive signal at the stylus;

generating an AC voltage by each of a plurality of coil resonant circuits of the stylus in response to the magnetic drive signal, each of the plurality of coil resonant circuits tuned to a different frequency of the magnetic drive signal and coupled to the stylus tip;

converting the AC voltage of a first coil resonant circuit of the plurality of coil resonant circuits to a DC voltage for powering circuitry of the stylus; and generating one or more channels for effecting communication between the stylus and the location sensor using one or more of the plurality of coil resonant circuits other than the first coil resonant circuit.

14. The method of claim 13, wherein stylus position information is communicated between the stylus and the location sensor using the one or more channels.

15. The method of claim 13, wherein stylus status information is communicated between the stylus and the location sensor using the one or more channels.

16. The method of claim 13, wherein stylus position and stylus status information is communicated between the stylus and the location sensor using the one or more channels.

17. The method of claim 13, wherein generating the one or more channels comprises generating two or more channels for effecting communication between the stylus and the location sensor.

18. The method of claim 17, wherein stylus position information is communicated between the stylus and the location sensor using a first channel of the two or more channels, and stylus status information is communicated between the stylus and the location sensor using a second channel of the two or more channels.

19. The method of claim 13, comprising modulating a stylus signal and communicating the modulated stylus signal between the stylus and the location sensor using the one or more channels.

20. The method of claim 13, wherein the generated one or more channels capacitively couples the stylus and the location sensor.

21. The method of claim 13, wherein the generated one or more channels magnetically couples the stylus and the location sensor.

22. The method of claim 13, comprising communicating one or more stylus status signals between the stylus and the location sensor via the one or more channels, the one or more stylus status signals comprising one or more of a signal representative of a user-initiateable function, a mouse function, a stylus pressure measurement or a stylus tip switch function.

* * * * *